(12) United States Patent
Kim et al.

(10) Patent No.: US 8,774,037 B2
(45) Date of Patent: Jul. 8, 2014

(54) METHOD AND APPARATUS FOR FEEDING BACK CHANNEL STATE INFORMATION

(75) Inventors: Hyung Tae Kim, Anyang-si (KR); Han Byul Seo, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 325 days.

(21) Appl. No.: 13/319,445

(22) PCT Filed: Jun. 17, 2010

(86) PCT No.: PCT/KR2010/003930
§ 371 (c)(1),
(2), (4) Date: Nov. 8, 2011

(87) PCT Pub. No.: WO2010/147416
PCT Pub. Date: Dec. 23, 2010

(65) Prior Publication Data
US 2012/0051257 A1    Mar. 1, 2012

Related U.S. Application Data

(60) Provisional application No. 61/218,395, filed on Jun. 18, 2009, provisional application No. 61/320,771, filed on Apr. 5, 2010, provisional application No. 61/350,007, filed on May 31, 2010.

(30) Foreign Application Priority Data

Jun. 14, 2010  (KR) .......................... 10-2010-0055990

(51) Int. Cl.
*H04L 12/26* (2006.01)
(52) U.S. Cl.
USPC ............................ 370/252; 370/432; 455/507

(58) Field of Classification Search
USPC .......... 370/235, 252, 328–338; 375/239, 260; 455/67.11, 507, 562.1
See application file for complete search history.

(56) References Cited

U.S. PATENT DOCUMENTS

| 8,531,958 B2* | 9/2013 | Sivanesan et al. ............. 370/235 |
| 2008/0025336 A1* | 1/2008 | Cho et al. ....................... 370/432 |
| 2008/0043865 A1* | 2/2008 | Kim et al. ....................... 375/260 |
| 2008/0132281 A1* | 6/2008 | Kim et al. ................... 455/562.1 |
| 2008/0260062 A1 | 10/2008 | Imamura |
| 2008/0305745 A1* | 12/2008 | Zhang et al. ................ 455/67.11 |
| 2008/0311939 A1* | 12/2008 | Hugl et al. ..................... 455/507 |
| 2009/0122857 A1* | 5/2009 | Li et al. .......................... 375/239 |

FOREIGN PATENT DOCUMENTS

EP  1001558 A2  5/2000
WO  WO 2005/057870 A1  6/2005

* cited by examiner

*Primary Examiner* — Michael Thier
*Assistant Examiner* — Vincelas Louis
(74) *Attorney, Agent, or Firm* — Birch, Stewart, Kolasch & Birch, LLP

(57) ABSTRACT

A method of a user equipment feeling channel state information in a wireless communication system including receiving a reference signal from a base station; generating first channel state information by measuring the reference signal; generating second channel state information based on the first channel state information; and transmitting the first channel state information and the second channel state information to the base station. The first channel state information is channel state information of a single user single cell Multi-input Multi-Output (MIMO) mode, and the second channel state information is channel state information of a multi-user MIMO (MU-MIMO) mode or a Cooperative Multiple Points Transmission and Reception (CoMP) mode.

11 Claims, 10 Drawing Sheets

METHOD AND APPARATUS FOR FEEDING BACK CHANNEL STATE INFORMATION

CROSS REFERENCE TO RELATED APPLICATIONS

This application is the National Phase of PCT/KR2010/003930 filed on Jun. 17, 2010, which claims priority under 35 U.S.C. §119(e) to U.S. Provisional Application Nos. 61/218,395 filed on Jun. 18, 2009, 61/320,771 filed on Apr. 5, 2010, 61/350,007 filed on May 31, 2010, and under 35 U.S.C. §119(a) to Patent Application No. 10-2010-0055990 filed in the Republic of Korea on Jun. 14, 2010, all of which are here expressly incorporated by reference into the present application.

FIELD OF THE INVENTION

The present invention relates to wireless communication, and more particularly, to a method and apparatus in which a user equipment feeds back channel state information to a base station in a wireless communication system.

BACKGROUND ART

Recently, in order to maximize the performance and communication capacity of a wireless communication system, a Multiple Input Multiple Output (hereinafter referred to as 'MIMO') system has been in the spotlight. The MIMO technique, unlike the existing technique using one transmit antenna and one receive antenna, adopts multiple transmit antennas and multiple receive antennas in order to improve the transmission efficiency of transmission and reception data. The MIMO system is also called a multi-antenna system. The MIMO technique is an application of a technique for gathering short pieces of data received from several antennas at one place and completing them in a single message, without depending on a single antenna path in order to receive the entire single message. Consequently, the data transmission rate can be enhanced in a specific range or the system range for a specific data transmission rate can be enhanced.

In the MIMO system, a user equipment feeds back channel state information (CSI) to a base station. Here, the channel state information can be fed back through a variety of information. For example, the channel state information can be fed back through a Precoding Matrix Index (PMI), a Channel Quality Indicator (CQI), a Rank Indicator (RI) or the like. The user equipment performs channel measurement based on a reference signal transmitted by the base station and feeds back a preference PMI and a preference RI to the base station on the basis of a result of the channel measurement. The preference PMI and RI can be a PMI and RI which is determined to produce the highest transmission rate in the case in which it is used by the base station under a specific channel state. The CQI indicates a Modulation and Coding Scheme (MCS) to guarantee an adequate ratio of packet errors in a PMI and RI which is fed back by the user equipment. The base station may use the channel state information, fed back by the user equipment, in scheduling.

In a conventional 3GPP Long Term Evolution (LTE) system, a user equipment assumes a single cell single user MIMO method in a process of calculating a CQI/PMI/RI. In other words, assuming that a serving base station allocates the entire transmission power to the user equipment and does not operate in conjunction with the base stations of neighbor cells in accordance with a cooperative multi-points transmission and reception (CoMP) method, the user equipment calculates the CQI/PMI/RI. The single cell single user MIMO method is a basic operation method in the MIMO technique of an LTE system. The single cell single user MIMO technique is hereinafter abbreviated to a normal operation.

A base station can be operated in a MU-MIMO mode or a CoMP mode as well as in the normal operation. A method of a user equipment feeding back channel state information, regulated in the existing LTE system, is difficult to apply to the MU-MIMO mode or the CoMP mode without change. This is because as described above, the user equipment assumes the normal operation in the process of calculating the channel state information.

Accordingly, in order to support a variety of transmission modes (e.g., the MU-MIMO mode and the CoMP mode) between a base station and a user equipment, there is a need for a CSI feedback method different from a CQI/PMI/RI feedback method defined in the existing LTE system.

SUMMARY OF INVENTION

An object of the present invention is to provide a method and apparatus in which the user equipment of a wireless communication system feeds back channel state information to a base station.

A method of a UE feeding back channel state information according to an aspect of the present invention includes receiving a reference signal from a base station; generating first channel state information by measuring the reference signal; generating second channel state information based on the first channel state information; and transmitting the first channel state information and the second channel state information to the base station. The first channel state information is channel state information of a single user single cell Multi-input Multi-Output (MIMO) mode, and the second channel state information is channel state information of a multi-user MIMO (MU-MIMO) mode or a Cooperative Multiple Points Transmission and Reception (CoMP) mode.

Each of the first channel state information and the second channel state information can include a Channel Quality Indication (CQI), a Precoding Matrix Index (PMI), and a Rank Indicator (RI).

The first channel state information can include a first PMI indicative of a first precoding matrix, and the second channel state information can include a second PMI indicative of a second precoding matrix. The second precoding matrix can include some of or all row vectors of the first precoding matrix.

The second PMI can include information about column vectors of the first precoding matrix constituting the second precoding matrix.

If the number of ranks indicated by the second channel state information is smaller than the number of ranks indicated by the first channel state information, the second PMI can indicate column vectors, included in the second precoding matrix, from among column vectors of the first precoding matrix in a bitmap.

If the number of ranks indicated by the second channel state information is smaller than the number of ranks indicated by the first channel state information and is a fixed value, the second PMI can indicate column vectors having a same number as the fixed value in the first precoding matrix.

If the number of ranks indicated by the second channel state information is smaller than the number of ranks indicated by the first channel state information, the second PMI can indicate column vectors, excluded from the second precoding matrix, from among column vectors of the first precoding matrix.

If the number of ranks indicated by the second channel state information is smaller than the number of ranks indicated by the first channel state information, the second PMI can indicate a second precoding matrix included in a reduced codebook. The reduced codebook can include only matrices, each including only some of column vectors of the first precoding matrix in a codebook which is determined according to the number of ranks indicated by the second channel state information.

If column vectors constituting the second precoding matrix have a linear combination of column vectors of the first precoding matrix, the second PMI can include a factor for each of the column vectors of the first precoding matrix.

If the number of ranks indicated by the second channel state information is greater than the number of ranks indicated by the first channel state information, the second PMI can indicate a second precoding matrix included in a reduced codebook, and the reduced codebook can include only matrices, each including all column vectors of the first precoding matrix in a codebook which is determined according to the number of ranks indicated by the second channel state information.

A method of a UE feeding back channel state information according to other aspect of the present invention includes receiving a reference signal from a base station through first carrier and second carrier; generating first channel state information for the first carrier by measuring the reference signal; generating second channel state information for the second carrier based on the first channel state information; and transmitting the first channel state information and the second channel state information to the base station, wherein the first carrier and the second carrier are contiguous carriers in frequency domain.

A user equipment according to another aspect of the present invention comprises a Radio Frequency (RF) unit configured to transmit and receive a radio signal and a processor connected to the RF unit. The processor receives a reference signal from a base station, generates first channel state information by measuring the reference signal, generates second channel state information based on the first channel state information, and transmits the first channel state information and the second channel state information to the base station. The first channel state information is channel state information of a single user single cell MIMO mode, and the second channel state information is channel state information of an MU-MIMO) mode or a CoMP mode.

In accordance with the present invention, a user equipment can feed back channel state information about a variety of transmission modes to a base station while minimizing an increase of feedback information. Further, in accordance with the present invention, a variety of transmission modes, such as the single cell single user MIMO mode, the MU-MIMO mode, and the CoMP mode, can be dynamically changed and used between a base station and a user equipment.

DETAIL DESCRIPTION OF THE INVENTION

The following technologies can be used in a variety of multiple access schemes, such as Code Division Multiple Access (CDMA), Frequency Division Multiple Access (FDMA), Time Division Multiple Access (TDMA), Orthogonal Frequency Division Multiple Access (OFDMA), and Single-Carrier Frequency Division Multiple Access (SC-FDMA). The CDMA scheme can be implemented using radio technology, such as Universal Terrestrial Radio Access (UTRA) or CDMA2000. The TDMA scheme can be implemented using radio technology, such as Global System for Mobile communications (GSM), General Packet Radio Service (GPRS), or Enhanced Data Rates for GSM Evolution (EDGE). The OFDMA scheme can be implemented using radio technology, such as IEEE (Institute of Electrical and Electronics Engineers) 802.11 (Wi-Fi), IEEE 802.16 (Wi-MAX), IEEE 802-20, or Evolved UTRA (E-UTRA). UTRA is part of a Universal Mobile Telecommunications System (UMTS). $3^{rd}$ Generation Partnership Project (3GPP) Long Term Evolution (LTE) is part of Evolved UTMS (E-UMTS) using E-UTRA, and it employs the OFDMA scheme in downlink and the SC-FDMA scheme in uplink. LTE-A (Advance) is an evolution of the 3GPP LTE.

For clarity, this application focuses on the LTE (Release 8) and LTE-A (Release 10). However, technical features of the present invention is not limited thereto.

Figure 1:
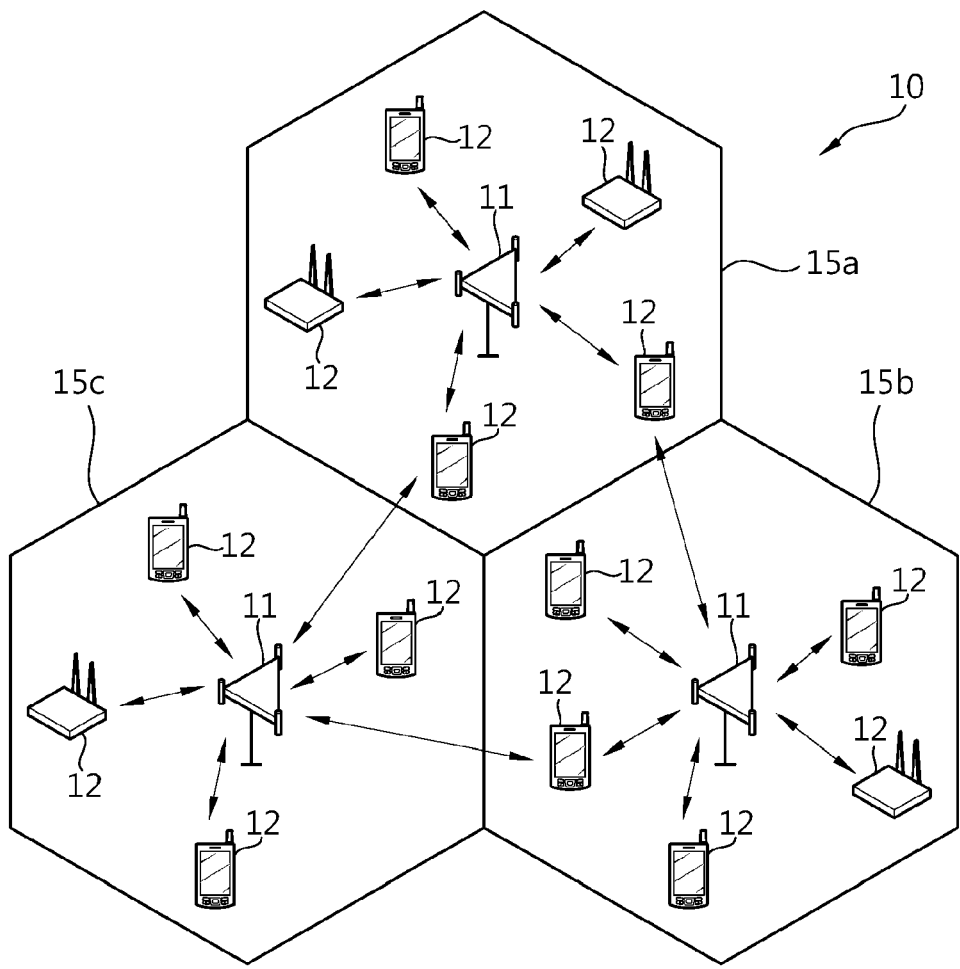
FIG. 1 is a block diagram showing a wireless communication system.

FIG. 1 is a block diagram showing a wireless communication system. The wireless communication system 10 includes at least one Base Station (hereinafter referred to as 'BS') 11. The BSs 11 provide communication services to respective geographical areas (in general, called 'cells') 15a, 15b, and 15c. The cell can be divided into a plurality of areas (called 'sectors'). A User Equipment (hereinafter referred to as a 'UE') 12 can be fixed and mobile and also referred to as another terminology, such as a Mobile Station (MS), a User Terminal (UT), a Subscriber Station (SS), a wireless device, a Personal Digital Assistant (PDA), a wireless modem, or a handheld device. The BS 11 commonly refers to a fixed station which communicates with the UEs 12, and it can be referred to as another terminology, such as an evolved-NodeB (eNB), a Base Transceiver System (BTS), or an access point (AP).

Hereinafter, downlink (DL) refers to communication from a BS to a UE, and uplink (UL) refers to communication from a UE to a BS. In downlink, a transmitter can be part of a BS and a receiver can be part of a UE. In uplink, a transmitter can be part of a UE and a receiver can be part of a BS.

The wireless communication system may support multiple antennas. A transmitter can use a plurality of transmit antennas, and a receiver can use a plurality of receive antennas. The transmit antenna refers to a physical or logical antenna used to transmit one signal or stream. The receive antenna refers to a physical or logical antenna used to receive one signal or stream. If a transmitter and a receiver use a plurality of antennas, a wireless communication system can be referred to as an MIMO (multiple input multiple output) system.

A variety of transmission schemes can be used in the MIMO system. The transmission scheme refers to a scheme in which a BS transmits downlink data to a UE. For example, the transmission scheme can include a single antenna scheme, an MIMO transmission scheme and the like.

The MIMO transmission scheme includes a transmit diversity scheme, a spatial multiplexing scheme, a beamforming scheme, and so on. The transmit diversity scheme is used to transmit the same data through multiple transmit antennas in order to improve the reliability of transmission. The spatial multiplexing scheme is used to transmit different data at the same time through multiple transmit antennas in order to transmit data at a high speed without increasing the bandwidth of a system. The beamforming scheme is used to increase the Signal to Interference plus Noise Ratio (SINR) of a signal by adding a weight according to a channel state in multiple antennas. Here, the weight can be expressed by a weight vector or a weight matrix, which is called a precoding vector or a precoding matrix.

The spatial multiplexing scheme includes spatial multiplexing for a single user and a spatial multiplexing for multiple users. The spatial multiplexing for a single user is also called Single User MIMO (SU-MIMO), and the spatial multiplexing for multiple users is called Spatial Division Multiple Access (SDMA) or Multi-User MIMO (MU-MIMO).

The MIMO transmission scheme can be semi-statically configured by higher layer signaling such as Radio Resource Control (RRC).

Figure 2:
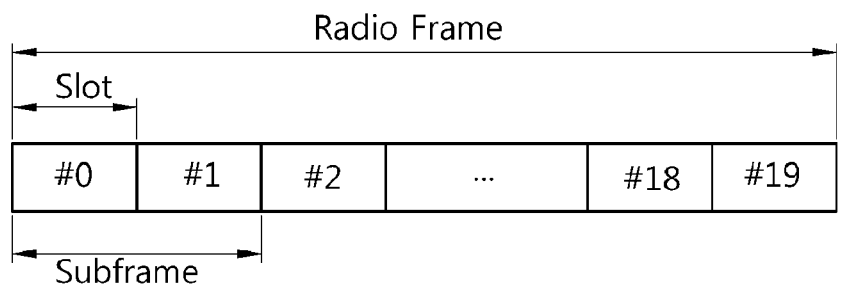
FIG. 2 is a diagram showing an example of a radio frame structure.

FIG. 2 is a diagram showing an example of a radio frame structure.

Referring to FIG. 2, the radio frame includes 10 subframes. A subframe includes two slots in time domain. The slots within the radio frame are assigned slot numbers from #0 to #19. A time for transmitting one subframe is referred to as a Transmission Time Interval (TTI). The TTI can be a scheduling unit for information transmission. For example, one subframe may have a length of 1 millisecond (ms), and one slot may have a length of 0.5 ms. The structure of a radio frame is only illustrative, and the number of subframes included in a radio frame or the number of slots included in a subframe may be modified in various manners.

Figure 3:
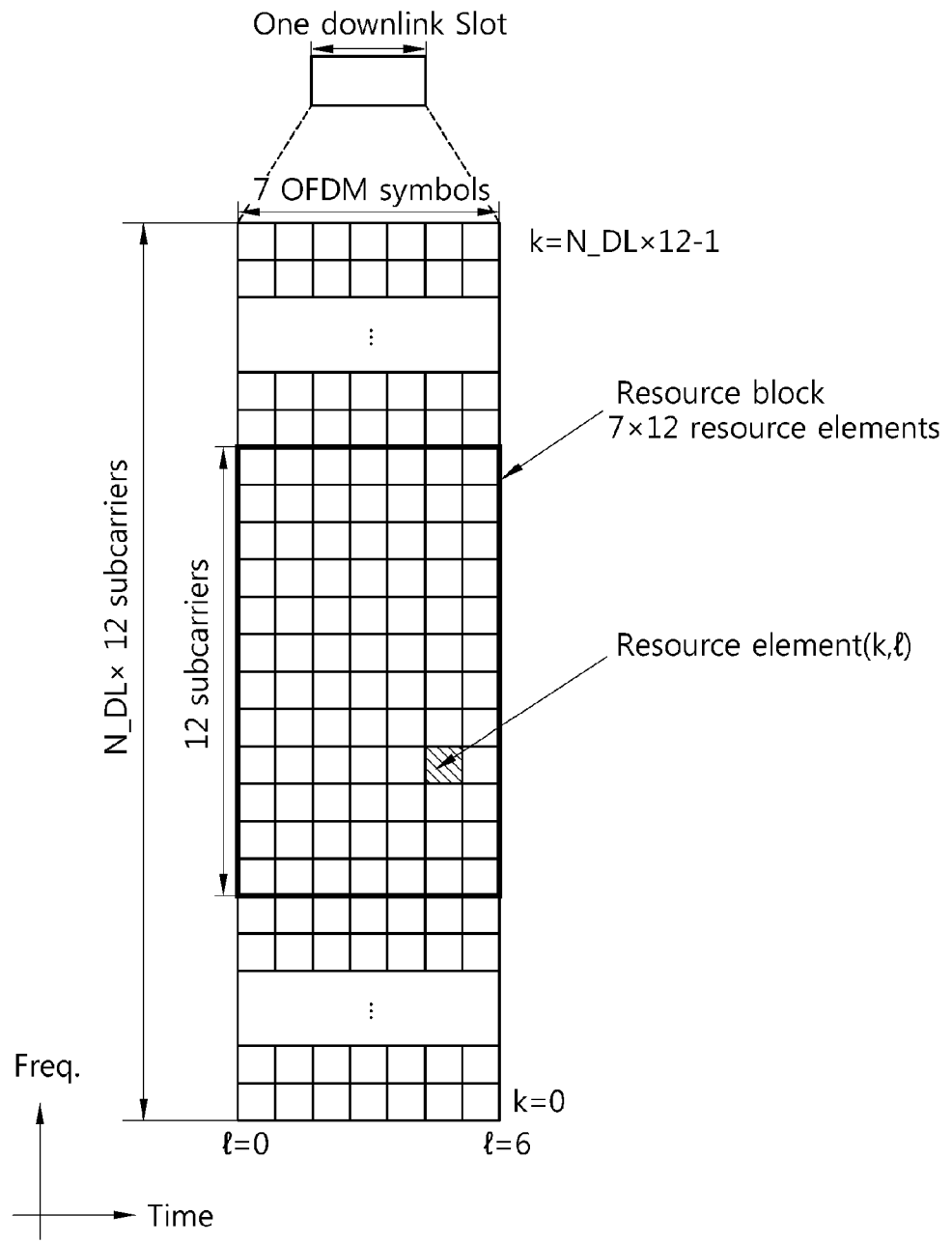
FIG. 3 is a diagram showing an example of a resource grid for one downlink slot.

FIG. 3 is a diagram showing an example of a resource grid for one downlink slot.

Referring to FIG. 3, a downlink slot includes a plurality of OFDM (orthogonal frequency division multiplexing) symbols in the time domain and an N_DL resource block (RB) in the frequency domain. The OFDM symbols are used to represent one symbol period and can also be called another terminology, such as an OFDMA symbol or an SC-FDMA symbol, according to a multi-access method. The number N_DL of resource blocks included in the downlink slot depends on a downlink transmission bandwidth set in a cell. In an LTE system, the number N_DL may be any one of 6 to 110. One resource block includes a plurality of subcarriers in the frequency domain.

Each of elements on the resource grid is called a resource element. The resource elements on the resource grid can be distinguished from each other based on an index pair (k, l) within a slot. Here, k (k=0, . . . , N_DLx12-1) is a subcarrier index within the frequency domain, and l (l=0, . . . , 6) is an OFDM symbol index within the time domain.

In FIG. 3, it is illustrated that one resource block includes 7×12 resource elements, including 7 OFDM symbols in the time domain and 12 subcarriers in the frequency domain, but the number of OFDM symbols within the resource block and the number of subcarriers are not limited thereto. The number of OFDM symbols may be modified in various ways according to the length of a Cyclic Prefix (hereinafter referred to as a 'CP') and subcarrier spacing. For example, in a normal CP, the number of OFDM symbols can be 7 and in an extended CP, the number of OFDM symbols can be 6. The resource grid for one downlink slot shown in FIG. 3 can also be applied to a resource grid for an uplink slot.

Figure 4:
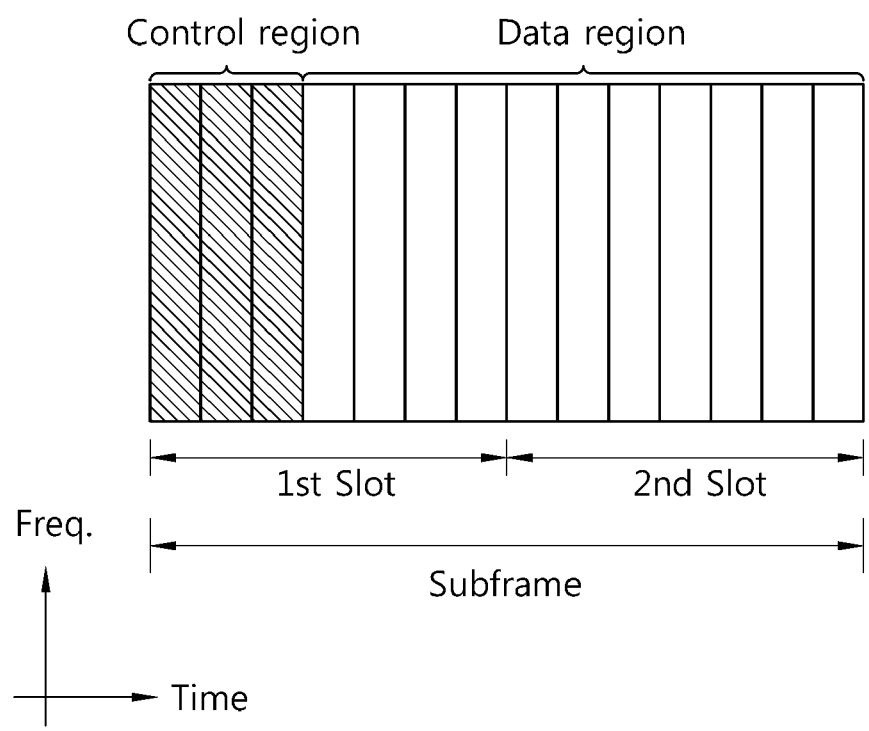
FIG. 4 is a diagram showing an example of a downlink subframe structure.

FIG. 4 is a diagram showing an example of a downlink subframe structure.

Referring to FIG. 4, the downlink subframe includes 2 consecutive slots. The former three OFDM symbols in the first slot of the downlink subframe correspond to a control region, and the remaining OFDM symbols correspond to a data region. Here, it is illustrated that the control region includes the three OFDM symbols, which is only exemplary.

The data region can be assigned PDSCH (physical downlink shared channel). Downlink data are transmitted on the PDSCHs.

The control region can be assigned control channels, such as PCFICH (physical control format indicator channel), PHICH (physical HARQ (hybrid automatic repeat request) indicator channel), and PDCCH (physical downlink control channel).

The PCFICH is used to carry, to a UE, information about the number of OFDM symbols used in the transmission of PDCCHs within a subframe. The number of OFDM symbols used in the transmission of PDCCHs may be changed every subframe. The PHICH is used to carry HARQ ACK (acknowledgement)/NACK (negative acknowledgement) for uplink data.

The PDCCH is used to carry downlink control information. The downlink control information can include downlink scheduling information, uplink scheduling information, an uplink power control command and the like. The downlink scheduling information is also called a downlink grant, and the uplink scheduling information is also called an uplink grant. The downlink grant may include a resource allocation field to indicate time-frequency resources through which downlink data are transmitted, a Modulation Coding Scheme (MCS) to indicate the MCS level of the downlink data, and so on.

Figure 5:
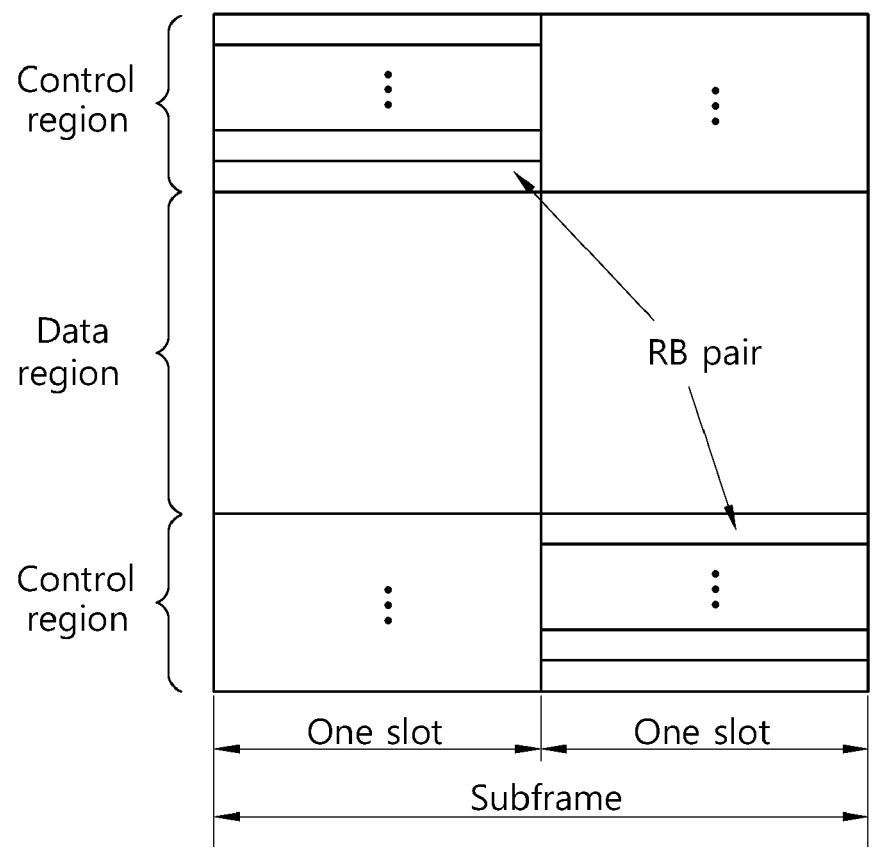
FIG. 5 is a diagram showing an example of an uplink subframe structure.

FIG. 5 is a diagram showing an example of an uplink subframe structure.

Referring to FIG. 5, the uplink subframe can be classified into a control region to which PUCCHs (physical uplink control channels) used to carry uplink control information are assigned and a data region to which PUSCHs (physical uplink shared channels) used to carry user data are assigned, in the frequency domain.

The PUCCHs for one UE are assigned a pair of Resource Blocks (RBs) 51 and 52 in the subframe, and the RBs 51 and 52 belonging to the RB pair occupy different subcarriers in two slots, respectively. This is called that the RB pair allocated to the PUCCH is frequency-hopped in a slot boundary.

The PUCCH can support multiple formats. That is, the PUCCH may be used to transmit uplink control information having a different number of bits for each subframe according to a modulation scheme. For example, in the case in which Binary Phase Shift Keying (BPSK) is used (PUCCH format 1a), uplink control information of 1 bit can be transmitted on the PUCCH. In the case in which Quadrature Phase Shift Keying (QPSK) is used (PUCCH format 1b), uplink control information of 2 bits can be transmitted on the PUCCH. The PUCCH format can also include format 1, format 2, format 2a, format 2b, and so on in addition to the above formats (for the PUCCH formats, reference can be made to Section 5.4 of 3GPP TS 36.211 V8.2.0 (2008-03) "Technical Specification Group Radio Access Network; Evolved Universal Terrestrial Radio Access (E-UTRA); Physical Channels and Modulation (Release 8)").

Figure 6:
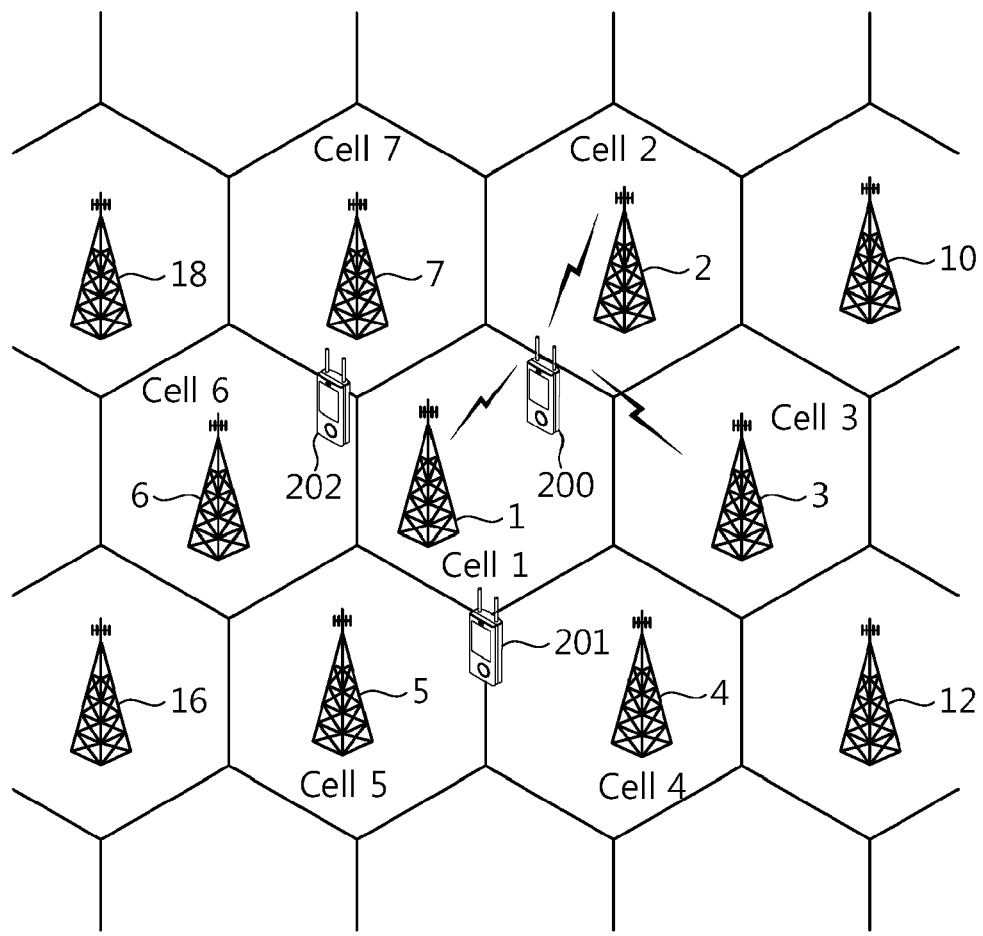
FIG. 6 is a diagram showing a UE performing communication in a multi-cell environment.

FIG. 6 is a diagram showing a UE performing communication in a multi-cell environment.

As shown in FIG. 6, a UE performs communication with a plurality of BSs placed in different cells. In general, in a multi-cell communication system, if transmission and reception are performed between BS and UE in the same time and frequency band without taking other cells into consideration, the performance of a UE placed closer to the cell boundary becomes much deteriorated because the UE is influenced by other cells.

In order to overcome the deterioration of the performance resulting from such interference, several schemes have so far been researched. If the CoMP (Cooperative Multiple Points Transmission and Reception) scheme is used as one of the schemes, the influence of the interference can be effectively cancelled, and thus the transmission rate of the entire system can be enhanced. The CoMP scheme refers to a communication scheme in which a plurality of cells transmits signals to their destination stations, such as UEs, while operating in conjunction with each other.

For example, assuming that a UE 200 belongs in a first cell Cell 1 as shown in FIG. 6, the first cell Cell 1 is a serving cell, and a first BS 1 is a serving BS. The UE 200 can be located in the boundary of the first cell Cell 1, a second cell Cell 2, and a third cell Cell 3. In this case, the UE 200 can be influenced by not only the first BS 1 (i.e., the serving BS), but also a second BS 2 and a third BS 3 (i.e., neighbor BSs). Accordingly, if the first BS 1, the second BS 2, and the third BS 3 cooperatively transmit their data signals to the UE 200, an interference signal can be minimized and so the reception performance of the UE 200 can be improved.

The CoMP mode can be classified into a Coordinated Scheduling (CS) method and a Joint Processing (JP) method. In the CS scheme, only one of a plurality of cells participating in the CoMP mode performs transmission on a specific time, whereas in the JP scheme, plural ones of a plurality of cells participating in the CoMP mode performs transmission on a specific time.

CSI (channel state information) fed back from a UE to a BS is described below.

The CSI refers to information about a channel state for a transmission link (e.g., downlink) as a result of a reference signal measured by a UE. The CSI can include, for example, a CQI (channel quality indicator), a PMI (precoding matrix indicator), and an RI (rank indicator). Alternatively, the CSI may refer to information induced by a CQI/PMI/RI.

The CQI indicates an MCS (modulation and coding scheme) level suitable for a channel. When the CQI is transmitted, any one of the following compression schemes may be used.

1. Wideband feedback: the wideband feedback is a scheme in which one CQI value for the entire system band is fed back.

2. UE-selected subband feedback: the UE-selected subband feedback is a scheme in which a UE estimates the channel quality of each subband, selects a plurality of subbands having an excellent channel quality, and feeds back an average CQI value for the selected subbands.

3. Higher-layer configured subband feedback: the higher-layer configured subband feedback is a scheme in which a CQI for each of subbands configured in a higher layer is fed back.

The PMI provides information about a precoding matrix in codebook-based precoding. The PMI is pertinent to the MIMO (multiple input multiple output) scheme. In the MIMO, what the PMI is fed back is referred to as a closed loop MIMO. The downlink transmission modes of a BS can be classified into, for example, the following 7 modes. The PMI feedback may be used only in Nos. 4, 5, and 6 of the following downlink transmission modes.

1. Single antenna port (port 0): mode in which precoding is not performed.

2. Transmit diversity: this can be used in 2 or 4 antenna ports using SFBC (space frequency block coding).

3. Open loop spatial multiplexing: this is an open loop mode to which an RI feedback-based rank can be adapted. If the rank is 1, the transmit diversity can be used. If the rank is higher than 1, large delay CDD (cyclic delay diversity) can be used.

4. Closed loop spatial multiplexing: mode to which precoding feedback supporting dynamic rank adaptation is applied.

5. Multi-user MIMO (MU-MIMO)

6. Closed-loop rank 1 precoding

7. Single antenna port (port 5): mode that can be used in beamforming in the case in which a UE-specific reference signal is used.

The RI is information about the number of ranks or layers recommended by a UE. That is, the RI indicates the number of streams which can be used in spatial multiplexing. The capacity of an MIMO channel is increased in proportion to the number of antennas, and the MIMO channel can be decomposed into independent channels. Assuming that the number of transmit antennas is Nt and the number of receive antennas is Nr, the number Ni of independent channels is Ni≤min{Nt, Nr}. Each of the independent channels can be considered as a spatial layer. The rank is the number of a non-zero eigenvalue of an MIMO channel matrix and can be defined as the number of spatial streams that can be multiplexed.

The RI is fed back only when a UE is operated in the MIMO scheme using spatial multiplexing. That is, the RI can be fed back only in the Nos. 3 and 4 from among the above-described downlink transmission modes. For example, in the single antenna port mode or the transmit diversity mode, the RI is not fed back. The RI can have a value 1 or 2 in a 2×2 antenna configuration and one of values 1 to 4 in a 4×4 antenna configuration.

The RI is always associated with one or more CQI feedbacks. That is, a CQI that is fed back is calculated assuming a specific RI value. Since the rank of a channel varies typically more slowly the CQI, it is feedback less often. For example, the transmission period of the RI can be a multiple of a CQI/PMI transmission period. RI always describes the rank on the whole system band, i.e. frequency-selective RI feedback is not supported.

A scheme for transmitting the above CSI includes a periodic transmission scheme and a non-periodic transmission scheme. The periodic transmission scheme is chiefly performed through the PUCCH, but may be performed through the PUSCH. In the case in which a BS requires more accurate channel state information, the BS requests the non-periodic transmission from a UE and then performs the non-periodic transmission scheme. The non-periodic transmission scheme is performed through the PUSCH. Since the PUSCH is used, the capacity can be increased and more detailed channel state reporting is possible. If the periodic transmission and the non-periodic transmission collide with each other, only the non-periodic transmission is performed.

In feedback channel state information such as a CQI/PMI/RI, a BS may first transmit reserved resource information, and a UE can then feed back channel information to the BS through radio resources selected from among radio resources according to the reserved resource information.

In the existing LTE system, a UE assumes a single cell single user MIMO mode (i.e., a normal operation) in a process of calculating channel state information. In other words, the UE calculates the CQI/PMI/RI on the assumption that a serving BS allocates the entire transmission power to the UE and does not operate together with the BSs of neighbor cells according to the CoMP (cooperative multi-points transmission and reception) method. The UE is operated on the above assumption, which is appropriate in an LTE system. This is because the LTE system supports the MU-MIMO mode of the simplest form using a CSI report for a single user MIMO mode. That is, in the MU-MIMO mode, the CSI report for the single user MIMO mode is used, and errors in a CSI which can occur resultantly are not compensated. Further, the LTE system does not explicitly implement the CoMP mode. In other words, an environment in which the same signal is transmitted in a plurality of cells is not taken into consideration.

However, in an LTE-A system, the MU-MIMO mode is sought to be used in a more sophisticated form, and the CoMP mode is sought to be explicitly used. Accordingly, a CSI feedback scheme now defined in the LTE system is insufficiently applied to a newly introduced operation (e.g., the MU-MIMO/CoMP mode). For example, the following two problems can occur.

First, in the case in which the MU-MIMO mode is used, only some of the entire transmission power of a serving BS is allocated to a single user. Accordingly, for accurate CSI feedback, each UE has to take transmission power allocated thereto into consideration when calculating a CQI/PMI/RI. An optimal rank calculated by each UE with consideration taken of transmission power allocated thereto may have a different value from an optimal rank calculated assuming the normal operation (i.e., the single cell single user MIMO mode). In general, when the MU-MIMO mode is operated, an optimal rank is smaller than an optimal rank when the single user MIMO mode is operated. This is because transmission power allocated to a UE is reduced and interference exists between the UEs.

Second, in the case in which the CoMP mode is used, a UE can be operated in a much improved channel state because of a mitigation in inter-cell interference (ICI), an increase of the reception rate of a desired signal, and the like, as compared with a single cell environment. That is, when the CoMP mode is used, an optimal rank can be increased as compared with a single cell environment.

In order to solve the problems, a method to be described below with reference to FIG. 7 or 8 may be used.

Figure 7:
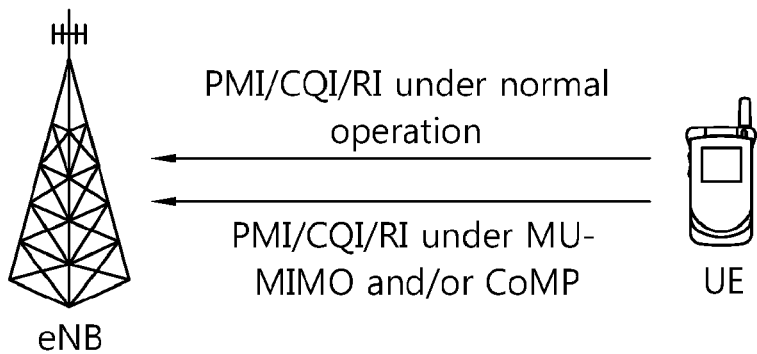
FIG. 7 is a diagram showing an example of a method of feeding back normal CSI and MU-MIMO/CoMP CSI.

FIG. 7 is a diagram showing an example of a method of feeding back normal CSI and MU-MIMO/CoMP CSI.

Referring to FIG. 7, a UE can feed back CSI for the MU-MIMO mode or the CoMP mode or both, together with CSI for the normal operation. That is, the UE can feed back two different kinds of CSI at the same time. One of CSI is CSI for the normal operation, and the other is CSI for the MU-MIMO/CoMP mode. This method is advantageous in that accurate CSI feedback is possible. This method, however, is an additional and independent method and is problematic in that feedback overhead is increased because additional information (i.e., MU-MIMO/CoMP CSI) is fed back. Hereinafter, it is assumed that a UE performs the normal operation, the MU-MIMO operation, and the CoMP operation, and pieces of CSI fed back to an eNB are abbreviated to normal CSI, MU-MIMO CSI, and CoMP CSI, respectively, for convenience' sake.

Figure 8:
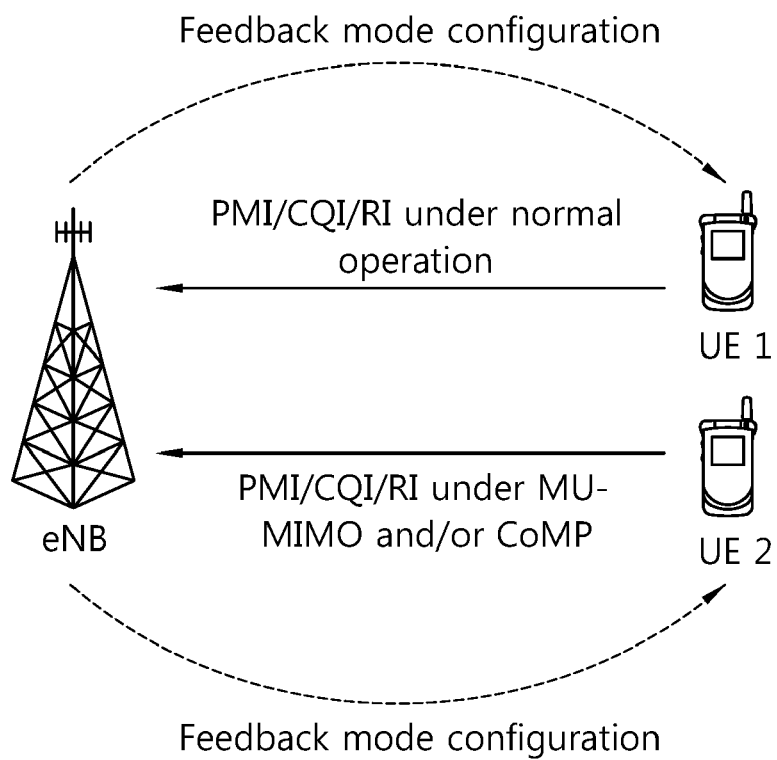
FIG. 8 is a diagram showing another example of a method of feeding back normal CSI and MU-MIMO/CoMP CSI.

FIG. 8 is a diagram showing another example of a method of feeding back normal CSI and MU-MIMO/CoMP CSI.

Referring to FIG. 8, several different CSI feedback modes are defined between an eNB and UEs and each of the UEs is set to operate in any one of the modes. For example, the eNB can set a UE 1 and a UE 2 through a CSI feedback setup message so that the UE 1 is operated in the normal operation mode and the UE 2 is operated in the MU-MIMO/CoMP (MU-MIMO or CoMP) operation mode. In this case, the UE 1 feeds back normal CSI to the eNB, and the UE 2 feeds back MU-MIMO/CoMP CSI to the eNB. That is, since each UE is operated in one CSI feedback mode, there is no problem in that the amount of feedback information further increases. However, since the CSI feedback mode is semi-statically configured by a higher layer signal, it may be difficult to support a dynamic change in the normal operation and the MU-MIMO/CoMP operation between the eNB and the UE.

The methods described with reference to FIGS. 7 and 8 are problematic as described above, and thus there is a need for a new CSI feedback method. A CSI feedback method according to an embodiment of the present invention is described below.

Figure 9:
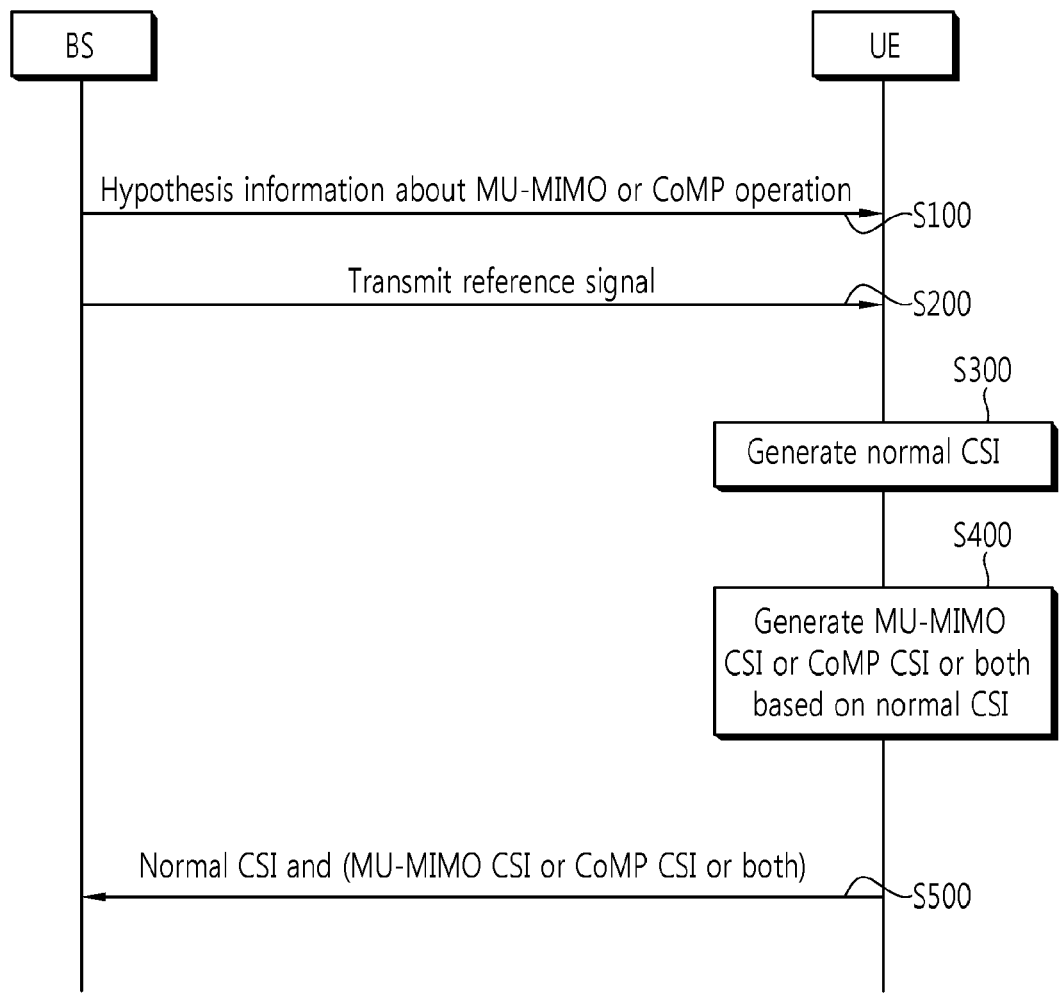
FIG. 9 is a diagram showing a method of feeding back channel state information according to an embodiment of the present invention.

FIG. 9 is a diagram showing a method of feeding back CSI according to an embodiment of the present invention.

Referring to FIG. 9, a BS transmits hypothesis information about the MU-MIMO/CoMP operation to a UE at step S100. The UE requires several hypotheses relating to a transmission mode in a process of calculating MU-MIMO/CoMP CSI. For example, the UE may require hypotheses, including 1. a scheme applied to an MU-MIMO mode (i.e., hypothesis for zero-forcing, MMSE, etc), 2. the number of UEs served in the same radio resources, 3. the assignment of transmission power, 4. a scheme to which the CoMP mode is applied (i.e., information about the JP scheme or the CS scheme), 5. information about cells participating in the CoMP mode, and 6. rank information for MU-MIMO or CoMP. The hypothesis information can provide a value for a hypothesis which is necessary for a UE to calculate MU-MIMO/CoMP CSI, and it may be transmitted to a UE as a higher layer signal or a physical layer signal through a PDCCH. However, the proposed method of feeding back CSI can also be operated without such hypotheses signaled at step S100.

The BS transmits a reference signal to the UE at step S200. In a wireless communication system, for channel measurement, information demodulation, and so on, a signal known to both a transmitter and a receiver is required, and the signal is referred to as a reference signal (RS). The reference signal can also be referred to as a pilot. The reference signal does not carry information induced from a higher layer, but can be generated in a physical layer.

The reference signal can be multiplied by a predefined reference signal sequence and then transmitted. The reference signal sequence can be a binary sequence or a complex sequence. For example, a PN (pseudo-random) sequence, an m-sequence, or the like can be used as the reference signal sequence. It is, however, to be noted that the above sequences are only illustrative, and the reference signal sequence is not specially limited. In the case in which a BS multiplies the reference signal by the reference signal sequence and then transmits a result of the multiplication, a UE can reduce the interference of signals of neighbor cells on the reference signal. Accordingly, the performance of channel measurement can be improved.

The reference signal can be classified into a common reference signal (common RS) and a dedicated reference signal (dedicated RS).

The common RS is transmitted to all the UEs within a cell. All the UEs within a cell can receive the common RS. In order to avoid inter-cell interference, the common RS can be determined according to a cell. In this case, the common RS is also called a cell-specific RS. The common RS can be used in channel measurement and information demodulation. The reference signal for only channel measurement can include, for example, a CSI-RS.

The dedicated RS is received by a specific UE or a specific UE group within a cell. Other UEs cannot use the dedicated RS. The dedicated RS is also called a UE-specific RS. The dedicated RS can be transmitted through a resource block allocated to transmit the downlink data of a specific UE. The dedicated RS can be used in information demodulation.

The reference signal transmitted by the BS may be a CSI-RS, but not limited thereto.

The UE generates normal CSI at step S300. The UE generates MU-MIMO/CoMP CSI on the basis of the normal CSI at step S400. That is, the UE generates CSI in relation to a variety of transmission modes. The MU-MIMO/CoMP CSI is one example of a variety of transmission modes. A process of the UE generating the MU-MIMO/CoMP CSI on the basis of the normal CSI is described in detail later.

The UE feeds back the normal CSI and the MU-MIMO/CoMP CSI to the BS at step S500. The BS may determine a transmission mode for the UE by taking the normal CSI and the MU-MIMO/CoMP CSI into consideration and then perform scheduling.

A method of a UE generating MU-MIMO CSI or CoMP CSI or both on the basis of normal CSI and feeding back the MU-MIMO CSI or/and the CoMP CSI is described below.

Each of the normal CSI, the MU-MIMO CSI, and the CoMP CSI may include a CQI (channel quality indication), a PMI (precoding matrix indicator), an RI (rank indicator), and so on. From among them, the PMI is first described below.

The precoding matrix (PM) indicated by PMI information included in the normal CSI may have already described a signal subspace that a UE can receive a signal with an excellent sensitivity from a BS. Accordingly, in the case in which a transmission rank is reduced for the MU-MIMO/CoMP operation, an optimum PM can be a subset of a signal subspace which is spanned by a PM preferred in the normal operation.

For example, in the case in which a BS cannot allocate the entire resources, such as transmission power, to a UE because it uses the MU-MIMO mode, the transmission rank can be reduced. The UE employs that a precoding matrix (PM) indicated by PMI information included in normal CSI describes a signal subspace that the UE can receive a signal having an excellent sensitivity from the BS. That is, the UE can select an optimum PM of the MU-MIMO mode using the vectors of the PM preferred in the normal operation.

It is assumed that a channel between the BS and the UE is a matrix H and the matrix H is subject to singular value decomposition with respect to a singular value $$\sigma_1^2 \geq \sigma_2^2 \geq \ldots \sigma_N^2,$$

thus becoming $H = U\Sigma V^H$. Here, $V^H$ is the Hermitian matrix of a matrix V and it refers to the conjugate transpose matrix of the matrix V. It is also assumed that an optimal rank of the normal operation is $N_1$. Then, an optimum PM of the normal operation spans a signal subspace described by $N_1$ orthogonal vectors $V_1, V_2, \ldots, V_{N_1}$. Here, $V_n$ ($1 \leq n \leq N_1$) is an $n^{th}$ column vector of the matrix V and is a right singular vector corresponding to an $n^{th}$ largest singular value $\sigma_n$.

Assuming that an optimal rank for the MU-MIMO operation is reduced to $N_2$ (Here, $N_1 \geq N_2$), an optimum PM in the MU-MIMO operation spans a signal subspace which is described by $N_2$ orthogonal vectors $V_1, V_2, \ldots, V_{N_2}$. It means that the optimum PM for the rank reduced to $N_2$ can be properly selected from among the column vectors of a PM preferred in the normal operation. Accordingly, the UE can transmit information, indicating column vector(s) selected from the PM in the normal operation, as MU-MIMO CSI information.

It is assumed that the PM preferred in the normal operation is $$B = [B_1 B_2 \ldots B_{N_1}].$$

Further, for example, assuming that in the MU-MIMO operation, an optimum PM applicable to the case in which the rank is reduced is C, C can be expressed using any one of the following four methods. That is, a PMI included in MU-MIMO CSI information can be transmitted using any one of the following four methods.

1. A bitmap can be used as the PMI of MU-MIMO CSI indicating whether each precoding vector (i.e., a column vector) of a PM preferred in the normal operation is included. The bitmap can have an $n^{th}$ bit value of 1 if an nth precoding vector (i.e., an $n^{th}$ column vector of B) $B_n$ is included in a PM for a rank C and can have an $n^{th}$ bit value of 0 if the $n^{th}$ precoding vector (i.e., the $n^{th}$ column vector of B) $B_n$ is not included in the PM for the rank C and vice versa.

For example, assuming that $B = [B_1 B_2 B_3]$ (i.e., $N_1 = 3$), a UE can transmit the PMI information of MU-MIMO CSI in a 3-bit bitmap. The value and the meaning of the bitmap are listed in the following Table 1.

TABLE 1

| BITMAP | OPTIMAL PM FOR REDUCED RANK |
| --- | --- |
| 000 | not available |
| 001 | [$B_3$] |
| 010 | [$B_2$] |
| 011 | [$B_2 B_3$] |
| 100 | [$B_1$] |
| 101 | [$B_1 B_3$] |
| 110 | [$B_1 B_2$] |
| 111 | [$B_1 B_2 B_3$] |

In Table 1, in the case in which a UE transmits ' ' as the PMI information of MU-MIMO CSI, it is meant that a first precoding vector (i.e., a first column vector) and a third precoding vector (i.e., a third column vector) included in the PM in the normal operation are included. That is, $C = [B_1 B_3]$. Here, the location of a column vector of C can be changed according to a PM codebook. For example, if [$B_3 B_1$] instead of [$B_1 B_3$] is included in the PM codebook, the UE can feed back $C = [B_3 B_1]$.

2. The PMI information of MU-MIMO CSI can be expressed by an index for the precoding vector of an optimum PM in the normal operation constituting C. In this case, in order to simplify signaling, $N_2$ can be restricted to a fixed value (e.g., 1).

For example, assuming that $B=[B_1\ B_2\ B_3]$ (i.e., $N_1=3$) and $N_2=1$, the PMI information of MU-MIMO CSI can be given 2 bits. Then, an optimum PM for the reduced rank for each piece of 2-bit information can be configured as in the following Table 2.

TABLE 2

| 2-BIT CSI FEEDBACK INFORMAITON | OPTIMAL PM FOR REDUCED RANK |
|---|---|
| 00 | not available |
| 01 | $[B_1]$ |
| 10 | $[B_2]$ |
| 11 | $[B_3]$ |

3. The PMI information of MU-MIMO CSI may indicate the index of a precoding vector which should be excluded from an optimum PM in the normal operation. That is, in configuring C (i.e., an optimum PM for the reduced rank), the PMI information of MU-MIMO CSI can indicate a precoding vector which should be excluded from a PM in the normal operation. The reduced rank $N_2$ may be restricted to $N_1-1$ in order to simplify signaling.

For example, assuming that $B=[B_1\ B_2\ B_3]$ (i.e., $N_1=3$) and $N_2=2$, the PMI information of MU-MIMO CSI can be given 2 bits. Then, a PM for the reduced rank for each piece of 2-bit information may be configured as in the following Table 3.

TABLE 3

| 2-BIT CSI FEEDBACK INFORMATION | OPTIMAL PM FOR REDUCED RANK |
|---|---|
| 00 | Not available |
| 01 | $[B_2\ B_3]$ |
| 10 | $[B_1\ B_3]$ |
| 11 | $[B_1\ B_2]$ |

For example, in the case in which the PMI information of MU-MIMO CSI is '01', it means that the first precoding vector of B is excluded. Of course, an excluded precoding vector can be mapped using another method different from the method in Table 3.

4. The PMI information of MU-MIMO CSI can be given in the form of an index for a matrix selected from a codebook set which is generated from the precoding vectors (i.e., column vectors) of B (i.e., an optimum PM in the normal operation).

In an $N_2$ rank, a codebook, which has a codebook size M, can be generated. It is assumed that matrices included in the codebook are $W_1, W_2, \ldots, W_M$. A UE selects a matrix in which all column vectors are composed of the column vectors of B (i.e., an optimum PM in the normal operation) from among the matrices included in the codebook. For example, if all column vectors included in the matrix $W_m$ are included in the B, the matrix $W_m$ is selected. Here, a matrix including column vectors except the column vectors of B is excluded. A codebook composed of selected matrices can be referred to as a reduced codebook. The UE determines an optimum PM in the MU-MIMO operation within the reduced codebook and then feeds back the index of the optimum PM as the PMI information of MU-MIMO CSI.

For example, assuming that $B=[B_1\ B_2\ B_3]$ (i.e., $N_1=3$) and $N_2=2$, two PMs, such as $W_3=[B_1\ B_2]$ and $W_8=[B_2\ B_3]$, can be included in the reduced codebook. In this case, the PMI information of MU-MIMO CSI can be given 1 bit. If the value of 1 bit is ' ', C can be indicated $W_3=[B_1\ B_2]$. If the value of 1 bit is ' ', C can be indicated $W_8=[B_2\ B_3]$. That is, the PMI information of MU-MIMO CSI can indicate which matrix in the reduced codebook is an optimum PM for a reduced rank. A codebook for each rank can be previously defined between a BS and a UE. The BS can know a reduced codebook, generated by the UE, through a PM indicated by the PMI of normal CSI. Further, the BS can know which matrix in the reduced codebook is an optimum PM on the basis of the PMI of MU-MIMO CSI. The PMI of MU-MIMO CSI has only to indicate a specific matrix in the reduced codebook. Accordingly, there is an advantage in that the number of necessary bits can be reduced as compared with the case in which a specific matrix is indicated in a not-reduced codebook.

In the above methods, the MU-MIMO operation has been illustrated as an operation in which a rank is reduced as compared with a rank in the normal operation, but not limited thereto. That is, if a rank in the CoMP operation is smaller than a rank in the normal operation, the above example can be applied.

Hereinafter, a method of a UE feeding back the PMI information of MU-MIMO CSI or the PMI information of CoMP CSI in the case in which a rank is increased for the MU-MIMO operation or the CoMP operation is described. In general, in the case in which the normal operation is performed and the CoMP operation is then performed between a UE and a BS, the UE can be operated in a channel state much improved as compared with the normal operation. In such a case, a rank in the CoMP operation can be larger than a rank in the normal operation. The CoMP operation is hereinafter illustrated as an operation in which a rank is increased as compared with a rank in the normal operation, but not limited thereto. That is, if a rank in the MU-MIMO operation is larger than a rank in the normal operation, an example to be described later can be applied.

In the case in which the number of ranks in the MU-MIMO operation is larger than the number of ranks in the normal operation, an optimum PM can be a superset of a signal subspace which is spanned by an optimum PM preferred in the normal operation. In the case in which a UE, together with a BS, performs the normal operation and the CoMP mode is then applied as described above, the UE can be operated in a channel state much improved as compared with the normal operation. In such a case, an RI can be increased as compared with the normal operation.

An optimum PM in the normal operation already includes some of information about a signal subspace in which a UE can receive a signal having high reception strength. Accordingly, in the case in which a UE is operated in accordance with the CoMP mode, all pieces of information for a preferred PM (optimum PM) need not to be fed back to a BS.

It is assumed that a channel between a BS and a UE is H and singular value decomposition for the channel matrix H is $H=U\Sigma V^H$. Here, U and V are orthogonal matrices, and $\Sigma$ is a diagonal matrix having a singular value $$\sigma_1^2 \geq \sigma_2^2 \geq \ldots \geq \sigma_N^2$$

as a diagonal element. It is also assumed that an optimal rank for the normal operation is $N_1$. In this case, an optimum PM in the normal operation is included in a signal subspace which is snapped by $N_1$ orthogonal vectors $V_1, V_2, \ldots, V_{N_1}$. Here, $V_n$ ($1 \leq n \leq N_1$) is an $n^{th}$ column vector of V and is a right singular vector corresponding to an $n^{th}$ singular value $\sigma_n$.

If an optimal rank for the MU-MIMO or CoMP operation is increased to $N_2$ ($N_2 > N_1$), an optimum PM for the increased rank spans a signal subspace which is described by $N_2$ orthogonal vectors $V_1, V_2, \ldots, V_{N_2}$. This means that the optimum PM for the increased rank is the superset of an optimum PM in the normal operation. Accordingly, a UE has only to indicate a precoding vector which has to be added to a PM in the normal operation.

It is assumed that a PM in the normal operation is $$B=[B_1 B_2 \ldots B_{N_1}]$$

and an optimum PM in the increased rank is C. In this case, the PMI of CoMP CSI can indicate a matrix index in a reduced codebook which is generated by the precoding vectors of the optimum PM B.

In an $N_2$ rank, a codebook, which has a codebook size M, can be generated. It is assumed that matrices included in the codebook are $W_1, W_2, \ldots, W_M$. A UE selects a matrix, including all column vectors of B (i.e., an optimum PM in the normal operation) from among the matrices included in the codebook. For example, if all the column vectors of B are included in the matrix $W_m$, the matrix $W_m$ is selected. A codebook composed of selected matrices can be referred to as a reduced codebook. The UE determines an optimum PM in the CoMP operation within the reduced codebook and then feeds back an index of the optimum PM as the PMI information of CoMP CSI.

For example, it is assumed that B=[$B_1$ $B_2$ $B_3$] (i.e., $N_1$=3) and $N_2$=4. Here, a reduced codebook may include two PMs, such as $W_2$=[$B_1$ $B_2$ $D_1$ $B_3$] and $W_8$=[$B_1$ $B_2$ $B_3$ $D_2$]. Then, the PMI of CoMP CSI can be given 1 bit. If a bit value of the PMI of CoMP CSI is ' ', the PMI of CoMP CSI can indicate C=$W_8$=[$B_1$ $B_2$ $B_3$ $D_2$]. If a bit value of the PMI of CoMP CSI is ' ', the PMI of CoMP CSI can indicate C=$W_2$=[$B_1$ $B_2$ $D_1$ $B_3$].

An example in which an optimum PM in the MU-MIMO/CoMP operation is composed of column vectors included in an optimum PM in the normal operation has been described above, but not limited thereto. An optimum PM in the MU-MIMO/CoMP operation can be indicated by a linear combination of column vectors included in an optimum PM in the normal operation. This is because in the case of $N_1 > N_2$, an $N_2$ number of vectors selected from among an $N_1$ number of vectors may not accurately indicate optimum subspace information for the $N_2$ rank. For example, assuming that $N_1$=2 and $N_2$=1, an optimum subspace for the $N_2$ rank may be $V_1$. However, a PM in the normal operation may not be a matrix directly composed of $V_1$ and $V_2$, but indicates a space in which $V_1$ and $V_2$ are spanned. Accordingly, $V_1$ may not be indicated using the above-described method. Such a problem can be solved by indicating an optimum PM for a reduced rank as a linear combination of the column vectors of an optimum PM in the normal operation and feeding back coefficients constituting the linear combination.

For example, it is assumed that $N_1$=2 and $N_2$=1. Here, an optimum PM $V_1$ for the MU-MIMO/CoMP operation can be expressed using $$V_1 \approx \alpha_1 c_1 + \alpha_2 c_2.$$

/. Here, $c_1$ and $c_2$ indicate a first column vector and a second column vector of an optimum PM in the normal operation, respectively. $\alpha_1$ and $\alpha_2$ indicate complex number coefficients. If an optimum PM in the normal operation is well designed, a rank 2 channel space can be accurately indicated. $V_1$ (i.e., an optimum PM) for the rank 1 can be estimated using an optimum PM in the normal operation.

In the case in which the number of transmit antennas increases, the present invention can be more efficient. In an LTE-A system, it is assumed that the number of transmit antennas is 8. In such a case, it is assumed that $N_1$=2 and $N_2$=1. As described above, information about an optimum PM in the normal operation includes information about a basis vector for a space which is spanned by $V_1$ and $V_2$ (orthogonal vectors for a rank 2 channel). If information about the optimum PM in the normal operation is not used, a large payload size can be required to indicate $V_1$ (an orthogonal vector for a rank 1 channel) in an 8-dimensional space. However, according to the present invention, the 8-dimensional space is reduced to a 2-dimensional space spanned by $c_1$ and $c_2$. Accordingly, the payload size can be reduced.

In the above example, it has been assumed that $N_1$=2 and $N_2$=1. However, in general, $V_i$=

$$\alpha_1{}^i c_1 + \alpha_2{}^i c_2 + \ldots + \alpha_{N_1}{}^i c_{N_1}$$

($1 \leq i \leq N_2$) can be used.

Here, $\alpha^i=[$ $$\alpha_1{}^i \alpha_2{}^i \ldots \alpha_{N_1}{}^i$$

] ($1 \leq i \leq N_2$) can be included in MU-MIMO/CoMP CSI and then fed back.

When a UE feeds back the RI of MU-MIMO/CoMP CSI, the UE can transmit only a difference between the RI of MU-MIMO/CoMP CSI and the RI of normal CSI. Alternatively, if a change between the normal operation and the MU-MIMO/CoMP operation is semi-statically configured between a BS and a UE by a higher layer signal, the RI of MU-MIMO/CoMP CSI may not be fed back.

The UE can transmit only a difference between the CQI of MU-MIMO/CoMP CSI and the CQI of normal CSI when feeding back the CQI of MU-MIMO/CoMP CSI.

As described above, in the present invention, CSI (this is referred to as first CSI) is generated in the normal operation, and CSI for other transmission mode (e.g., the MU-MIMO/CoMP operation) (this is referred to as second CSI) is generated on the basis of the first CSI. The second CSI can be described using a less number of bits as compared with the case in which the second CSI is independently generated. This is because correlation with the first CSI is employed. Accordingly, according to the present invention, a UE can feed back additional CSI even without increasing feedback overhead excessively. Further, since a UE feeds back CSI for a variety of transmission modes, a transmission mode between a BS and the UE can be dynamically changed.

Although the normal operation and the MU-MIMO/CoMP operation have been illustrated and described, the present invention can be widely applied to a case in which there is a correlation between pieces of feedback information. For example, the present invention can be applied to a multi-carrier system. First, the multi-carrier system is described below.

The existing 3GPP LTE system supports a case in which a downlink bandwidth and an uplink bandwidth are differently configured. However, it is on the assumption for one carrier. That is, the 3GPP LTE system supports only a case in which a downlink bandwidth differs from an uplink bandwidth in the state in which one carrier is defined for each of the downlink and the uplink. For example, the 3GPP LTE system can support up to 20 MHz and an uplink bandwidth and a downlink bandwidth can differ from each other, but only one carrier is supported in the uplink and the downlink.

However, the multi-carrier system supports a carrier aggregation (CA). The carrier aggregation refers to that a broad band can be configured by aggregating a plurality of component carriers (CC) of a narrow band. The carrier aggregation can support the throughput which is increased through the extension of a transmission bandwidth, prevent an increase of the costs resulting from the introduction of a broad band radio frequency (RF) device, and secure compatibility with the existing system. The extension of the transmission bandwidth can support a bandwidth of up to 100 MHz if 5 carriers are allocated as the granularity of a carrier unit having, for example, a bandwidth of 20 MHz.

The carrier aggregation can be divided into a contiguous carrier aggregation in which an aggregation is performed between contiguous carriers in the frequency domain and a non-contiguous carrier aggregation in which an aggregation is performed between non-contiguous carriers. The non-contiguous carrier aggregation is also called a spectrum aggregation.

The bandwidths of carriers used in a carrier aggregation may be identical to each other or may differ from each other. For example, in order to construct a 40 MHz band, two 20 MHz carriers can be used. Alternatively, in order to construct a 40 MHz band, one 20 MHz carrier and two 10 MHz carriers can be used.

Further, a total bandwidth used in the uplink and a total bandwidth used in the downlink may be identical to each other or may differ from each other. For example, three 20 MHz carriers are used in the uplink and thus a total bandwidth of 60 MHz can be used. Five 20 MHz carriers can be used in the downlink and thus a total bandwidth of 100 MHz can be used. Hereinafter, the multi-carrier system refers to a system which can support a plurality of carriers on the basis of a carrier aggregation.

In the multi-carrier system, since a UE has to feed back CSI for each component carrier, CSI feedback overhead is increased. In such a case, if the present invention is used, CSI feedback overhead can be reduced.

Figure 10:
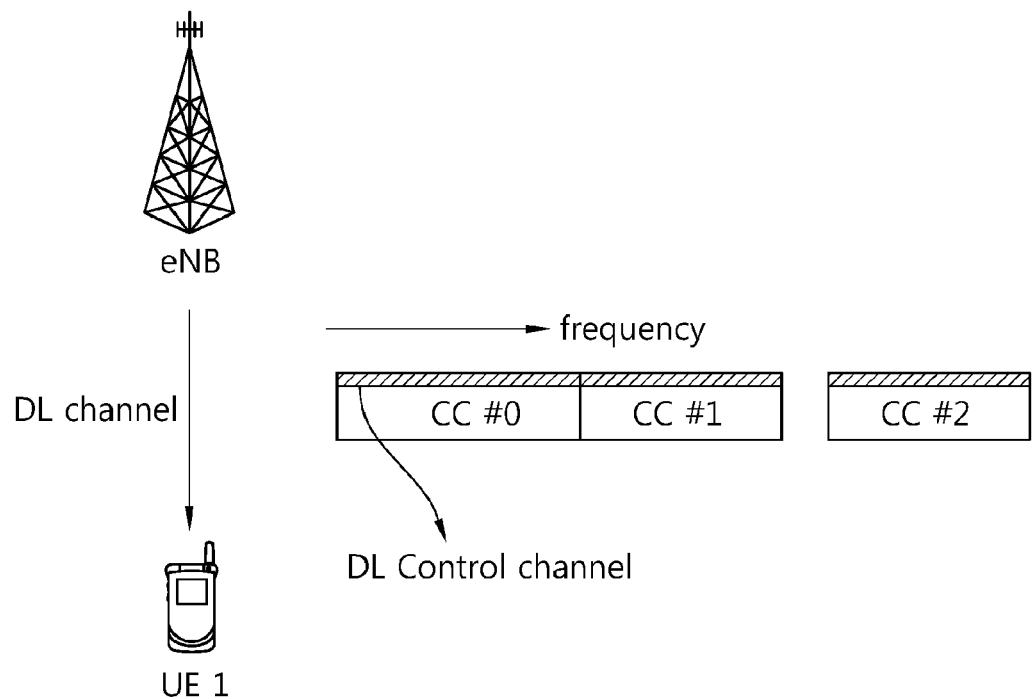
FIG. 10 is a diagram showing an example of a multi-carrier system.

FIG. 10 is a diagram showing an example of the multi-carrier system.

Referring to FIG. 10, there are three component carriers (CC). From among them, the component carriers CC#0 and CC#1 are contiguously placed in the frequency domain, and the component carrier CC#2 is spaced apart from the component carriers CC#0 and CC#1 in the frequency domain. Since the component carriers CC#0 and CC#1 are contiguously placed, there is a high probability that the CSI of each CC can be commonly used in many parts. That is, if a UE finds one PM in the frequency band for each CC, there is a high probability that the UE can have a common or at least similar characteristic. Accordingly, the UE can feed back only CSI for any one (for example, CC#0) of contiguous CCs, but may not feed back CSI for the remaining CC (for example CC#1). An eNB can receive CSI fed back for the component carrier CC#0 and assume that the contiguous component carrier CC#1 has the same CSI as the component carrier CC#0. In accordance with this method, CSI feedback overhead for a UE can be reduced, and the measurement of a channel state performed by the eNB is not greatly influenced.

Figure 11:
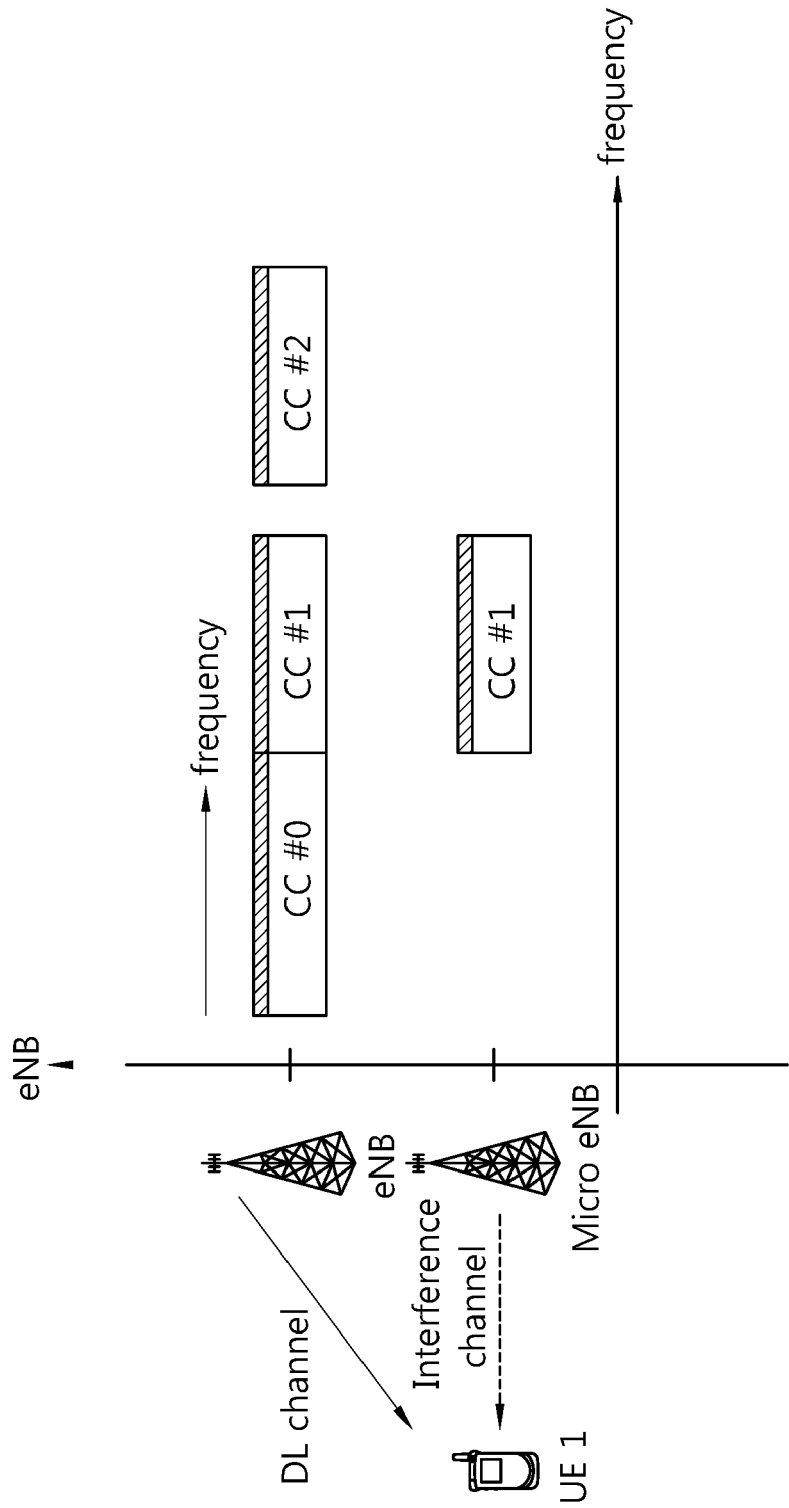
FIG. 11 is a diagram showing another example of a multi-carrier system.

FIG. 11 is a diagram showing another example of the multi-carrier system.

Referring to FIG. 11, a UE 1 can receive a signal from one eNB and at the same time, receive an interference signal from the other eNB. In such a case, although an optimum PM is identical in contiguous CCs (e.g., CC#0, CC#1), a rank can be different. For example, when a micro eNB located in a cell transmits a signal using the component carrier CC#1, the signal can function as an interference signal. In this case, there is a high probability that a rank of the component carrier CC#1 between the eNB and the UE 1 becomes smaller than a rank of the component carrier CC#0. This is because an SINR for the component carrier CC#1 will be lower than an SINR for the component carrier CC#0. In such a case, the PM of the component carrier CC#1 can have a subset relationship with the PM of the component carrier CC#0. Accordingly, the PM of the component carrier CC#1 can be expressed using the PM of the component carrier CC#0. That is, the methods that can be used in the case in which the number of ranks is reduced, from among the methods described with reference to the normal operation and the MU-MIMO/CoMP operation, can be used. The methods can include, for example, a method of indicating which column vector is included in the PM of the component carrier CC#1 in the optimum PM of the component carrier CC#0 in a bitmap, a method of indicating the index of a precoding vector that should be excluded from the optimum PM of the component carrier CC#0, a method using a reduced codebook generated in the optimum PM of the component carrier CC#0, and a method of indicating the PM of the component carrier CC#1 in a linear combination of the column vectors of the component carrier CC#0. Accordingly, the present invention can also be applied to the multi-carrier system.

Figure 12:
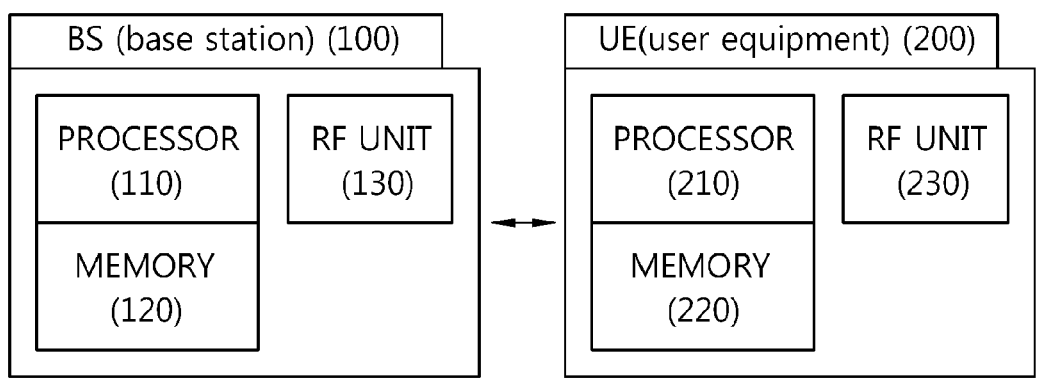
FIG. 12 is a block diagram showing a BS and a UE.

FIG. 12 is a block diagram showing an eNB and a UE.

The BS 100 includes a processor 110, memory 120, and an RF (radio frequency) unit 130. The processor 110 implements the proposed functions, process, and/or methods. That is, the processor 110 transmits hypothesis information and a reference signal to the UE 200 and performs a transmission mode and scheduling for the UE on the basis of CSI fed back by the UE 200. The memory 120 is connected to the processor 110 and configured to store various pieces of information for driving the processor 110. The RF unit 130 is connected to the processor 110 and configured to transmit or receive or both a radio signal.

The UE 200 includes a processor 210, memory 220, and an RF unit 230. The processor 210 receives the reference signal, generates first CSI for the normal operation by measuring the received reference signal, and generates second CSI for the MU-MIMO/CoMP operation having a different rank from the normal operation on the basis of the first CSI. The processor 210 feeds back the first CSI or the second CSI or both to the BS 100. The layers of a radio interface protocol can be implemented by the processor 210. The memory 220 is connected to the processor 210 and configured to store various pieces of information for driving the processor 210. The RF unit 230 is connected to the processor 210 and configured to transmit or receive or both a radio signal.

The processor 110, 210 can include an Application-Specific Integrated Circuit (ASIC), other chipset, a logic circuit, a data processor and/or a converter for converting a baseband signal and a radio signal, and vice versa. The memory 120, 220 can include Read-Only Memory (ROM), Random Access Memory (RAM), flash memory, a memory card, a storage medium and/or other storage device. The RF unit 130, 230 can include one or more antennas for transmitting or receiving or both a radio signal. When the above embodiments are implemented in software, the above schemes can be implemented using a module (process, function or the like) which performs the above functions. The module can be stored in the memory 120, 220 and executed by the processor 110, 210. The memory 120, 220 can be placed inside or outside the processor 110, 210 and connected to the processor 110, 210 using a variety of wellknown means.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of a user equipment feeding back channel state information in a wireless communication system, the method comprising:
   receiving a reference signal from a base station;
   generating first channel state information by measuring the reference signal;
   generating second channel state information based on the first channel state information; and transmitting the first channel state information and the second channel state information to the base station,
   wherein the first channel state information is channel state information of a single user single cell Multi-input Multi-Output (MIMO) mode, and the second channel state information is channel state information of a multi-user MIMO (MU-MIMO) mode or a Cooperative Multiple Points Transmission and Reception (COMP) mode,
   wherein each of the first channel state information and the second channel state information includes a Channel Quality Indication (CQI), a Precoding Matrix Index (PMI), and a Rank Indicator (RI), and
   wherein the first channel state information includes a first PMI indicative of a first precoding matrix, the second channel state information includes a second PMI indicative of a second precoding matrix, and the second precoding matrix includes some of or all column vectors of the first precoding matrix.

2. The method of claim 1, wherein the second PMI includes information about column vectors of the first precoding matrix constituting the second precoding matrix.

3. The method of claim 1, wherein if a number of ranks indicated by the second channel state information is smaller than a number of ranks indicated by the first channel state information, the second PMI indicates column vectors, included in the second precoding matrix, from among column vectors of the first precoding matrix in a bitmap.

4. The method of claim 1, wherein if a number of ranks indicated by the second channel state information is smaller than a number of ranks indicated by the first channel state information and is a fixed value n, the second PMI indicates n column vectors selected from the first precoding matrix.

5. The method of claim 1, wherein if a number of ranks indicated by the second channel state information is smaller than a number of ranks indicated by the first channel state information, the second PMI indicates column vectors, excluded from the second precoding matrix, from among column vectors of the first precoding matrix.

6. The method of claim 1, wherein if a number of ranks indicated by the second channel state information is smaller than a number of ranks indicated by the first channel state information, the second PMI indicates a second precoding matrix included in a reduced codebook, and the reduced codebook includes only matrices, each of which includes only some of column vectors of the first precoding matrix.

7. The method of claim 1, wherein if column vectors constituting the second precoding matrix have a linear combination of column vectors of the first precoding matrix, the second PMI includes a coefficient for each of the column vectors of the first precoding matrix.

8. The method of claim 1, wherein if a number of ranks indicated by the second channel state information is greater than a number of ranks indicated by the first channel state information, the second PMI indicates a second precoding matrix included in a reduced codebook, and the reduced codebook includes only matrices, each including all column vectors of the first precoding matrix in a codebook which is determined according to the number of ranks indicated by the second channel state information.

9. A method of a user equipment feeding back channel state information in a multi-carrier system, the method comprising:
   receiving a reference signal from a base station through a first carrier and a second carrier;
   generating first channel state information for the first carrier by measuring the reference signal;
   generating second channel state information for the second carrier based on the first channel state information; and
   transmitting the first channel state information and the second channel state information to the base station,
   wherein the first carrier and the second carrier are contiguous carriers in frequency domain, and
   wherein the first channel state information includes a first precoding matrix index (PMI) indicative of a first precoding matrix, the second channel state information includes a second PMI indicative of a second precoding matrix, and the second precoding matrix includes some of or all column vectors of the first precoding matrix.

10. The method of claim 9, wherein the second PMI includes information about column vectors of the first precoding matrix constituting the second precoding matrix.

11. A user equipment, comprising:
   a Radio Frequency (RF) unit configured to transmit or receive a radio signal; and
   a processor connected to the RF unit,
   wherein the processor is configured to:
   receive a reference signal from a base station,
   generate first channel state information by measuring the reference signal,
   generate second channel state information based on the first channel state information, and
   transmit the first channel state information and the second channel state information to the base station, and transmit the first channel state information and the second channel state information to the base station,
   wherein the first channel state information is channel state information of a single user single cell MIMO mode, and the second channel state information is channel state information of an MU-MIMO) mode or a CoMP mode;
   wherein each of the first channel state information and the second channel state information includes a Channel Quality Indication (CQI), a Precoding Matrix Index (PMI), and a Rank Indicator (RI), and
   wherein the first channel state information includes a first PMI indicative of a first precoding matrix, the second channel state information includes a second PMI indicative of a second precoding matrix, and the second precoding matrix includes some of or all column vectors of the first precoding matrix.

* * * * *